US010180664B2

(12) United States Patent
Ascherman (10) Patent No.: US 10,180,664 B2
(45) Date of Patent: Jan. 15, 2019

(54) CO₂ GENERATOR AND CONTROLLER FOR MONITORING, GENERATING, AND THERBY ENRICHING CO₂ GAS CONCENTRATIONS IN THE ATMOSPHERE SURROUNDING AGRICULTURAL CROPS, AND/OR HORTICULTURAL AND PHARMACEUTICAL PLANTS IN A CONTROLLED ENVIRONMENT AGRICULTURE ("CEA") FACILITY

(71) Applicant: SENTINEL GLOBAL PRODUCT SOLUTIONS, INC., Santa Rosa, CA (US)

(72) Inventor: R. Kurt Ascherman, Newport Coast, CA (US)

(73) Assignee: Sentinel Global Product Solutions Inc., Santa Rosa, CA (US)

( * ) Notice: Subject to any disclaimer, the term of this patent is extended or adjusted under 35 U.S.C. 154(b) by 450 days.

(21) Appl. No.: 14/883,567

(22) Filed: Oct. 14, 2015

(65) Prior Publication Data
US 2016/0100531 A1    Apr. 14, 2016

Related U.S. Application Data

(60) Provisional application No. 62/063,762, filed on Oct. 14, 2014.

(51) Int. Cl.
G05D 7/00     (2006.01)
G05B 11/42    (2006.01)
A01G 7/02     (2006.01)

(52) U.S. Cl.
CPC ............... G05B 11/42 (2013.01); A01G 7/02 (2013.01)

(58) Field of Classification Search
CPC ................................. G05B 11/42; A01G 7/02
(Continued)

(56) References Cited

U.S. PATENT DOCUMENTS 6,269,286 B1 * 7/2001  Tse .......................... C01B 3/36
                                                      422/626
6,273,071 B1 * 8/2001  De Lima C. ......... F02M 23/08
                                                      123/522

(Continued)

OTHER PUBLICATIONS

Kaya, Y. "Greenhouse gas control technologies." Proceedings of the 6th International Conference on Greenhouse Gas Control Technologies. 2002.pp. 1851-1854.*

(Continued)

*Primary Examiner* — Satish Rampuria
(74) *Attorney, Agent, or Firm* — Craig M. Stainbrook; Stainbrook & Stainbrook, LLP (57) ABSTRACT

A CO₂ generation and control system for controlling ambient gas CO₂ concentrations in a controlled environment agriculture facility, including a housing, a controller disposed within said housing, a CO₂ gas supply electronically coupled to said controller so as to receive control signals from said controller; wherein said controller includes a plurality of data ports for connection to one or more environmental condition sensors, and further includes software, which when executed receives and responds to signals from said one or more data ports and adjusts gas output from said gas supply in response thereto, the adjustments being infinitely adjustable between no gas output to high gas output.

19 Claims, 11 Drawing Sheets

(58) Field of Classification Search
USPC .................................................. 700/275–306
See application file for complete search history.

(56) References Cited

U.S. PATENT DOCUMENTS

| | | | | |
|---|---|---|---|---|
| 6,348,099 B1 * | 2/2002 | Xia | ....................... | C23C 16/401 |
| | | | | 118/684 |
| 7,775,292 B1 * | 8/2010 | Romanco | ............... | A62C 35/02 |
| | | | | 169/16 |
| 2004/0194371 A1 * | 10/2004 | Kinnis | ................... | A01G 9/246 |
| | | | | 47/17 |
| 2008/0257738 A1 * | 10/2008 | Seiwert | ................... | C02F 1/685 |
| | | | | 204/549 |
| 2010/0049417 A1 * | 2/2010 | Bailey | ....................... | C25B 1/04 |
| | | | | 701/100 |
| 2012/0078408 A1 * | 3/2012 | Li | ........................... | C01B 3/384 |
| | | | | 700/105 |
| 2014/0299197 A1 * | 10/2014 | Dornbach | ............. | F16K 27/041 |
| | | | | 137/14 |

OTHER PUBLICATIONS

Reeves, Scott. "Coal-seq project update: field studies of ECBM recovery/CO2 sequestration in coalseams." Greenhouse Gas Control Technologies. 2003. pp. 1-6.*

Weisser, Daniel. "A guide to life-cycle greenhouse gas (GHG) emissions from electric supply technologies." Energy 32.9 (2007): 1543-1559.*

* cited by examiner

CO₂ GENERATOR AND CONTROLLER FOR MONITORING, GENERATING, AND THERBY ENRICHING CO₂ GAS CONCENTRATIONS IN THE ATMOSPHERE SURROUNDING AGRICULTURAL CROPS, AND/OR HORTICULTURAL AND PHARMACEUTICAL PLANTS IN A CONTROLLED ENVIRONMENT AGRICULTURE ("CEA") FACILITY

CROSS REFERENCES TO RELATED APPLICATIONS

The present application claims the benefit of U.S. Provisional Patent Application Ser. No. 62/063,762, filed Oct. 14, 2014.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates most generally to environmental control systems for use in controlled environment agriculture ("CEA") facilities, and more particularly to atmospheric gas control systems for CEA facilities, and still more particularly to a $CO_2$ generator and controller for monitoring, generating, and thereby enriching $CO_2$ gas concentrations in the atmosphere surrounding agricultural crops, and/or horticultural and pharmaceutical plants in a CEA facility.

Background Discussion

It is well-established that plant and crop yields can be increased by enhancing $CO_2$ concentrations in the atmosphere immediately surrounding the growing plants. When the many variables affecting plant metabolism and growth are closely controlled—such as light, nutrients, temperature, humidity, soil and water pH, and the like—there are measurable benefits to be realized by providing and controlling increased atmospheric $CO_2$ concentrations. The accepted optimal concentration is now understood to be approximately 1500 ppm for plants generally, while normal atmospheric concentrations at sea level average around 300 ppm. Greater concentrations than 1,500 ppm can be toxic to the plants, and lower concentrations results in slower growth rates. Accordingly, it is desirable to keep atmospheric $CO_2$ at optimal elevated levels in CEA facilities.

However, not all controlled environment agriculture ("CEA") facilities are the same. Grow room size, air circulation patterns, light heating and cooling systems, the integrity of seals on greenhouse panels, doors, and windows, and so forth, can all have considerable effects on $CO_2$ gas containment and escape. Accordingly, a system to maintain $CO_2$ at optimal levels must both monitor ambient concentrations and must generate gas in precise amounts.

Unfortunately, known systems operate in binary fashion only—on or off—and do not provide $CO_2$ generation in amounts carefully tailored to changing grow room conditions. At a minimum, such systems waste energy, and therefore money, but they also fail to create the optimal growing conditions for plants, which is also wasteful and uneconomical, inasmuch as growing times are extended, delaying product readiness for markets, and resources needed for plant growth are consumed over longer periods of time. Indeed, this is the perennial problem for CEA operators: how to produce high quality marketable crops and plants using resources in the most economical way. It is well understood that achieving those ends requires careful resource control strategies and techniques that manage plant growth resources (water, air, light and dark, nutrients, temperature, humidity, etc., and $CO_2$), while balancing the provision of optimal resources with practical costs. The present invention addresses this need.

SUMMARY OF THE INVENTION

The present invention is a $CO_2$ generation and control system for controlling ambient gas $CO_2$ concentrations in a controlled environment agriculture facility. The system includes a housing, a controller disposed within the housing, a $CO_2$ gas supply electronically coupled to the controller so as to receive control signals from the controller. The controller includes a plurality of data ports for connection to one or more environmental condition sensors, and further includes software, which when executed receives and responds to signals from the data ports and adjusts and finely tunes the gas output from the gas supply in response to the received sensor input. Unlike prior art systems, the adjustments are infinitely adjustable between no gas output to high gas output.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

The present invention is a $CO_2$ generation and control system that provides finely tailored control of ambient $CO_2$ concentrations in a controlled environment agriculture facility to ensure optimal atmospheric concentrations for plant growth.

Referring first to FIGS. 1 through 11, wherein like reference numerals refer to like components in the various views, there is illustrated therein a new and improved $CO_2$ generator as used in a preferred embodiment of the inventive system, the generator denominated 10 herein.

Figure 1:
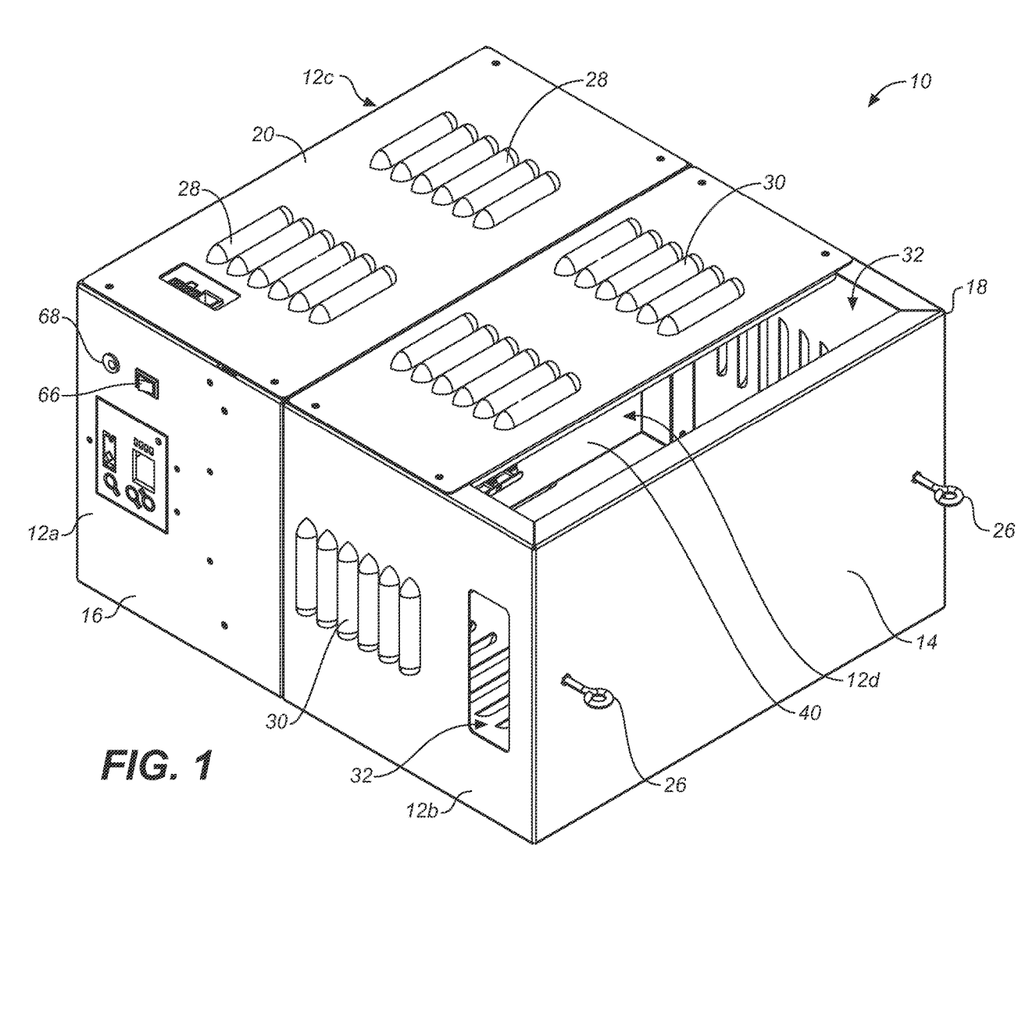
FIG. 1 is an upper front right perspective view of the CO2 generator of the present invention.
Figure 2:
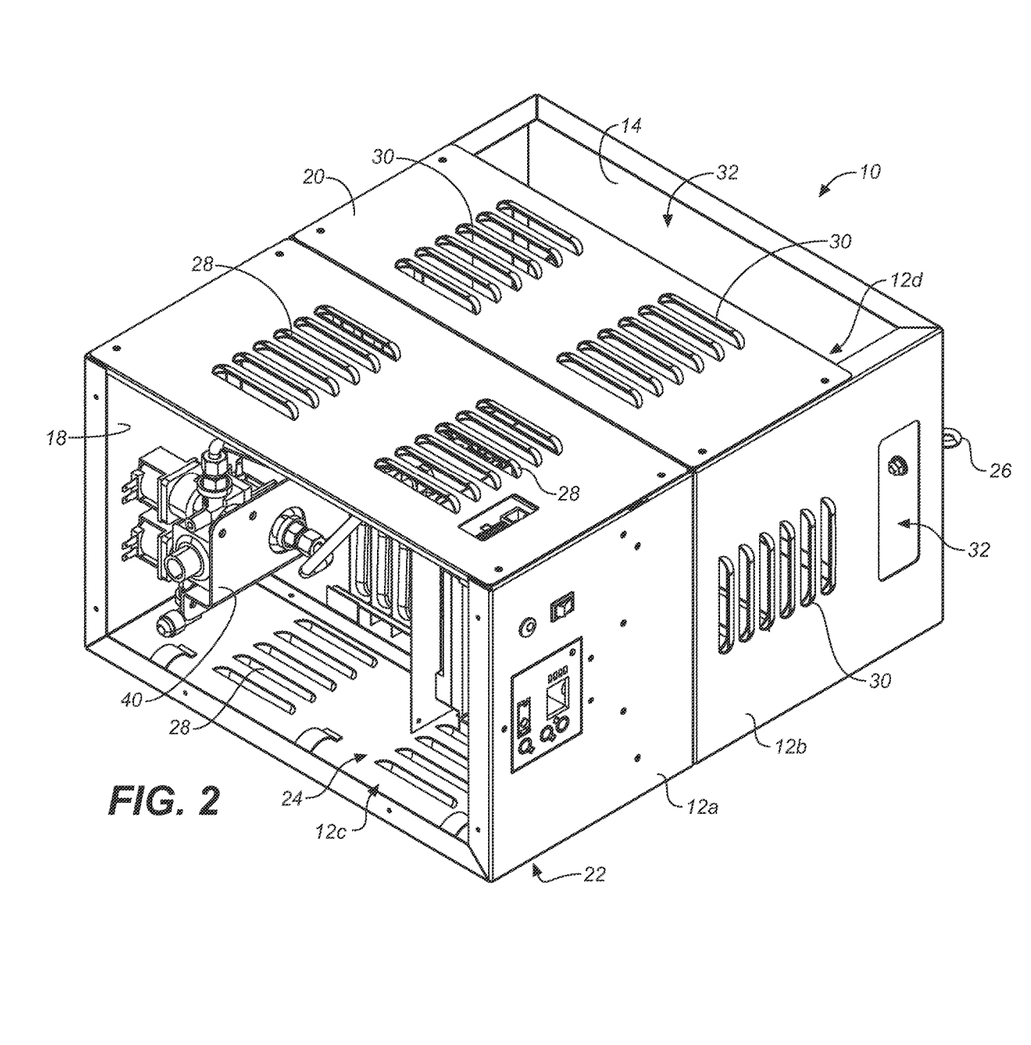
FIG. 2 is a lower front right perspective view thereof.
Figure 3:
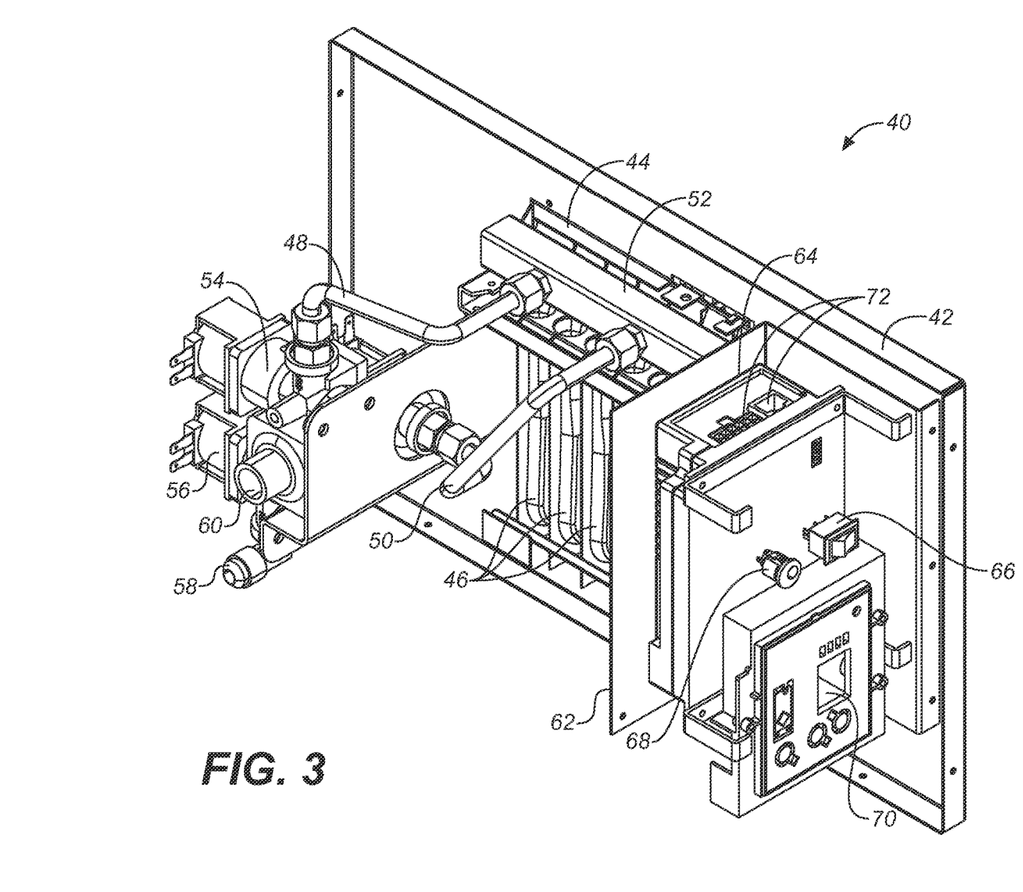
FIG. 3 is lower right perspective view of the gas valve and burner assembly of the CO2 generator, shown removed from the generator housing.
Figure 4:
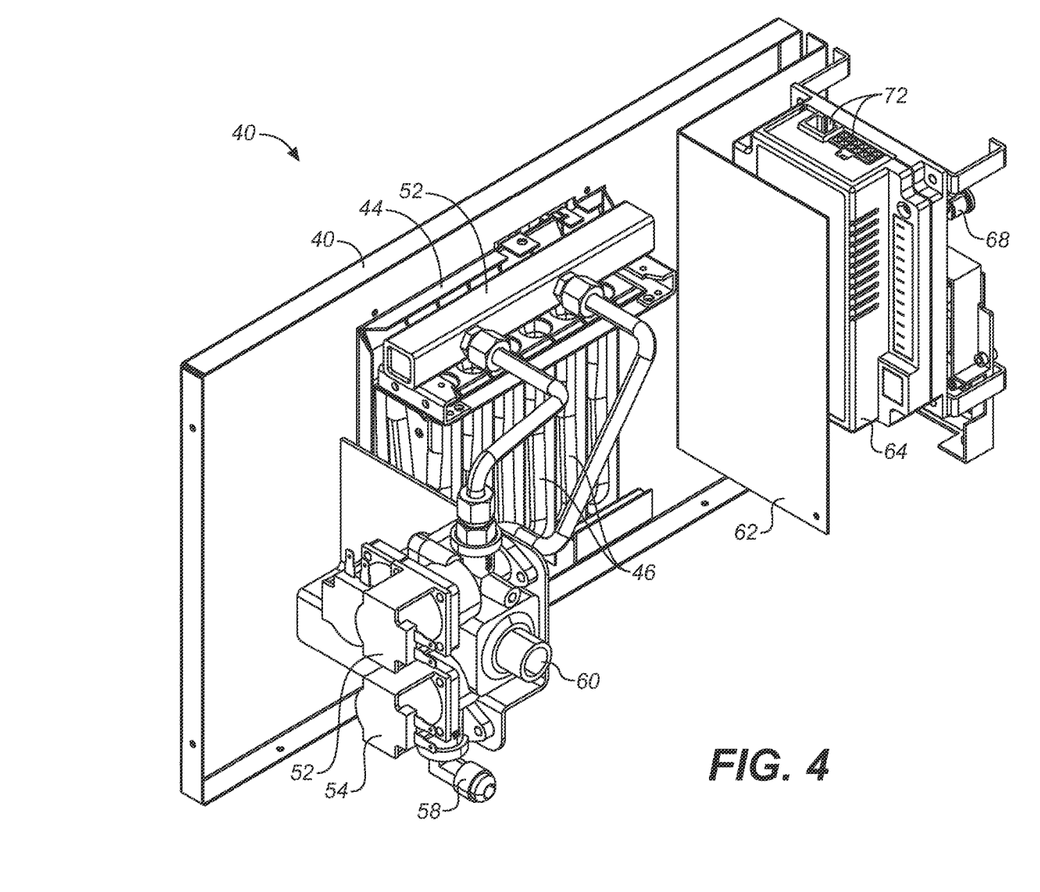
FIG. 4 is a lower left perspective view thereof.
Figure 5:
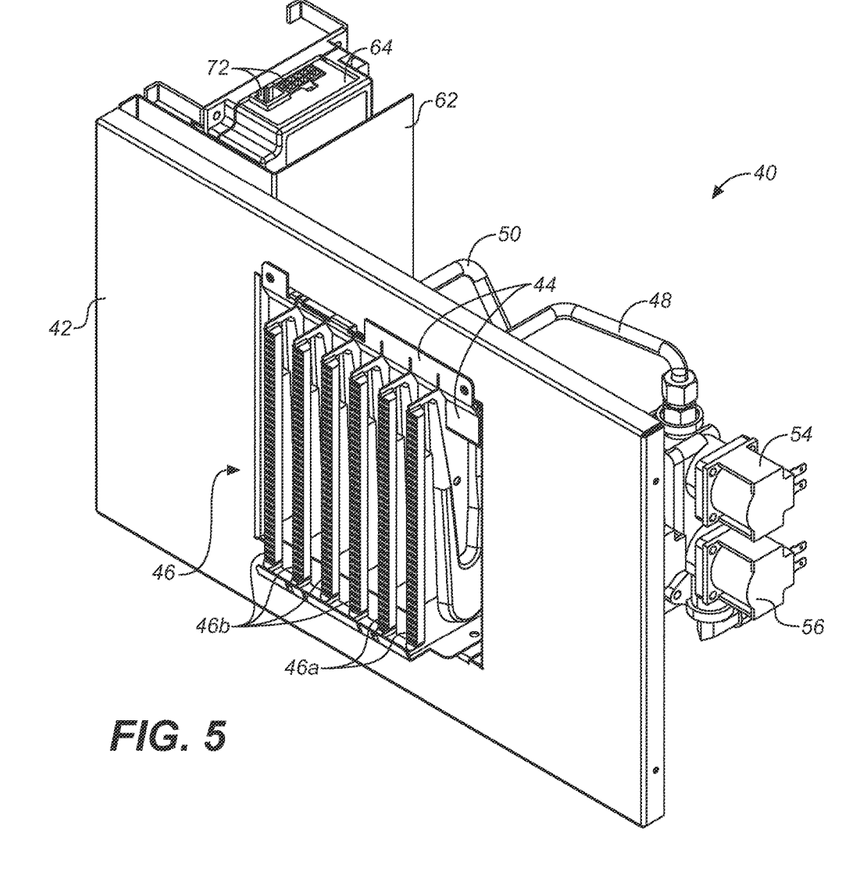
FIG. 5 is an upper left perspective view thereof.
Figure 6:
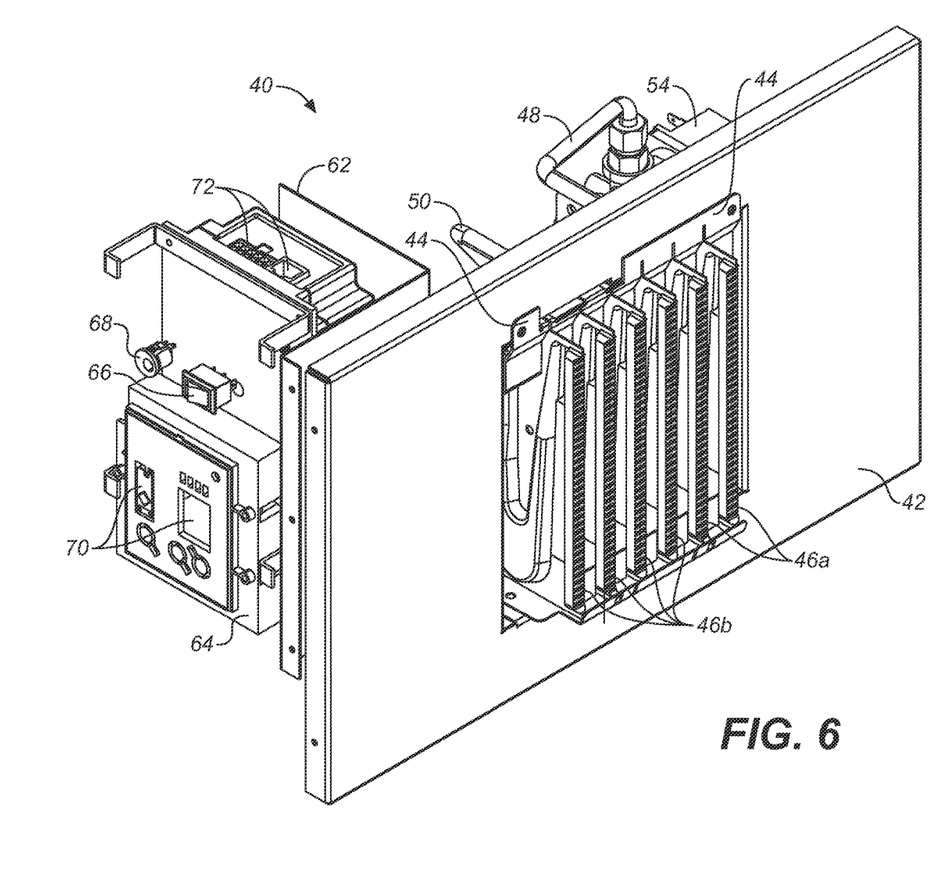
FIG. 6 is an upper right perspective view thereof.
Figure 7:
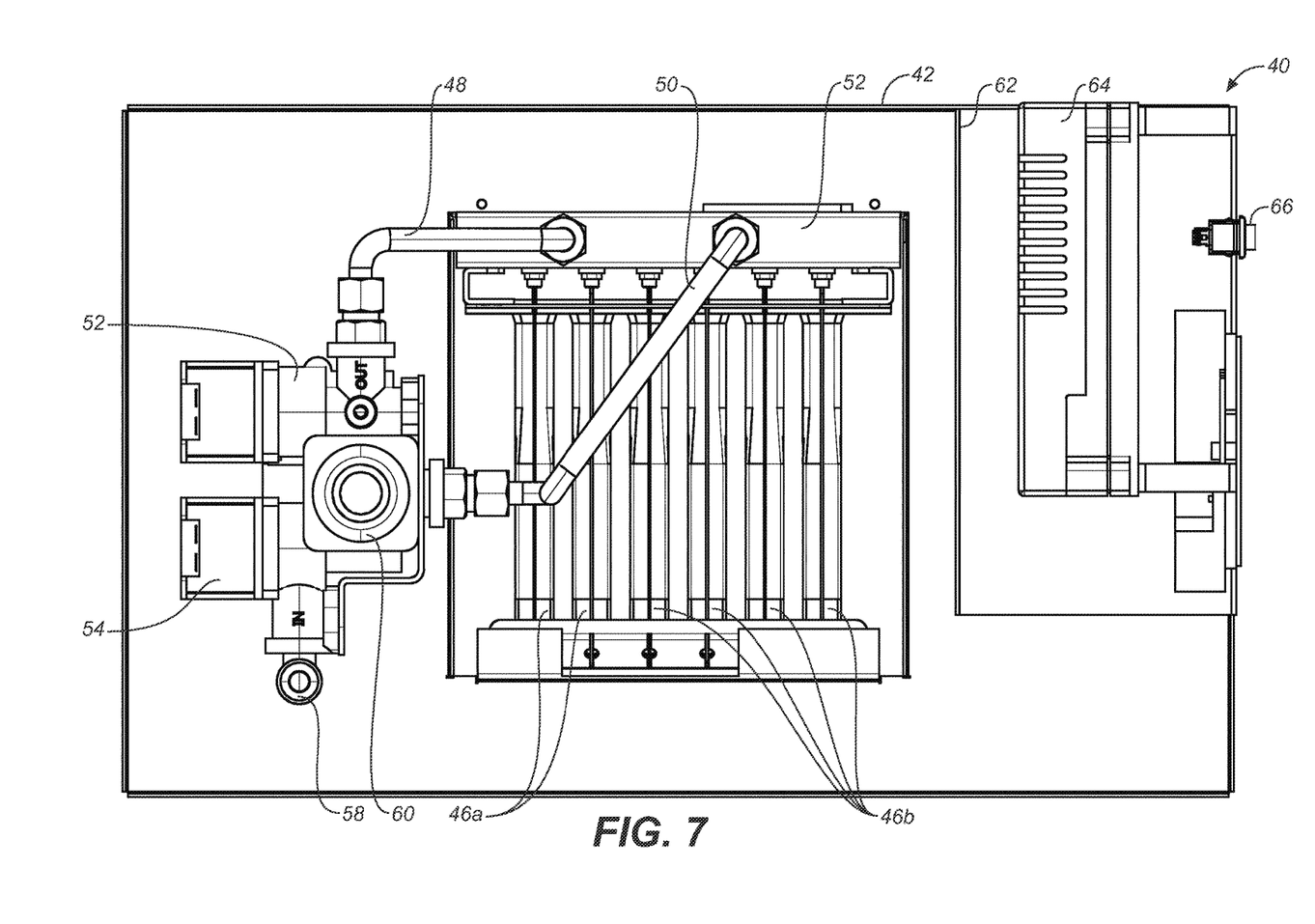
FIG. 7 is a bottom plan view thereof.
Figure 8:
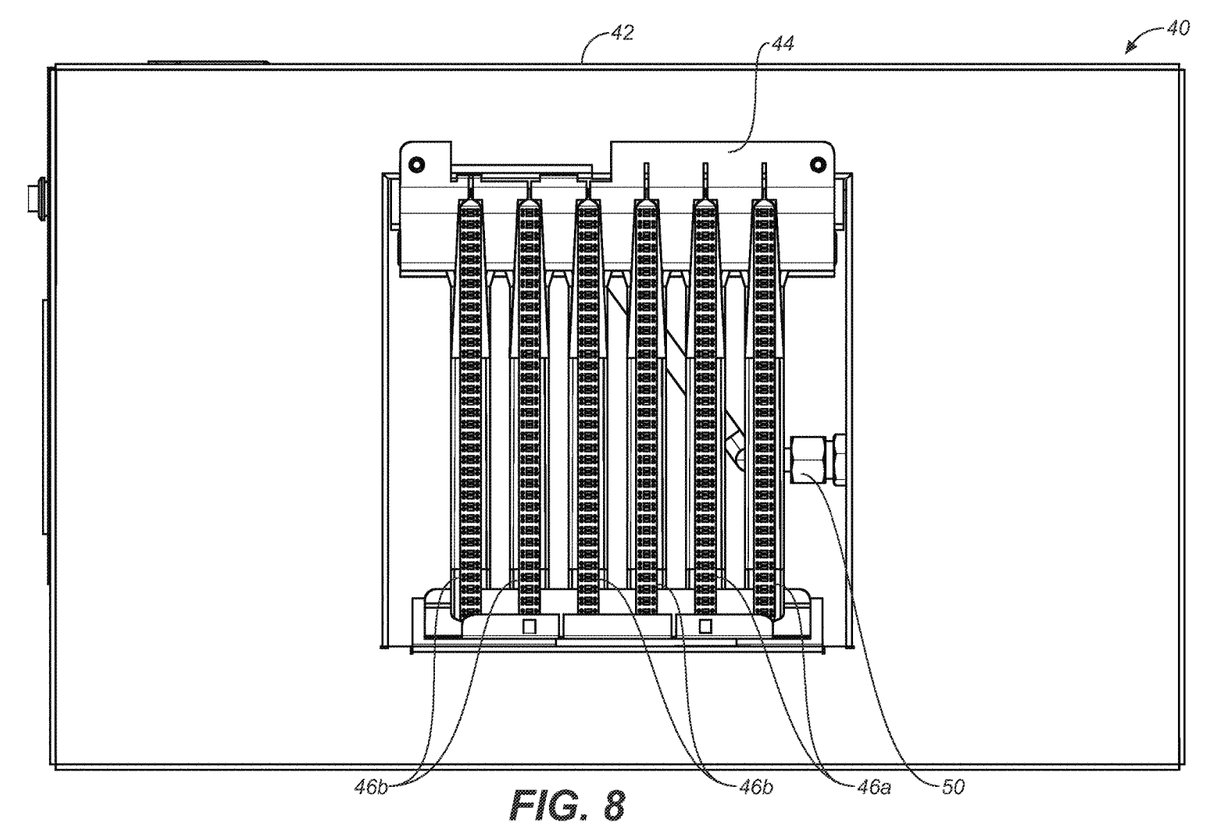
FIG. 8 is a top plan view thereof.

Referring next particularly to FIGS. 1-2, there is shown the $CO_2$ generator housing and burner assembly. The orientation in the views show the housing laid over on its side. These views further show that the generator housing and burner assembly 10 includes a housing 12 having a top side 14, a right side 16, a left side 18, a front side 20, a back side 22, and an open bottom 24. The top side 14 is a panel that may include hanging hardware 26, such as eyebolts, for hanging the generator from a greenhouse/grow room ceiling. A plurality of air vents 28 for providing air to the burners and circulating air through the interior volume of the lower portion 12a of the housing are disposed in rows around various sides of the lower portion 12A of the generator housing; conversely, $CO_2$ outlet vents 30 and openings 32 are disposed around the upper portion 12b of the housing 12 on the front, right and left sides. The housing (or case) is preferably fabricated from sheet metal and is intended for placement above the plant canopy in a CEA growing environment (such as a greenhouse or nursery) so as to ensure that $CO_2$ gas descends down onto plants as it is generated.

Disposed within the housing is a gas valve and burner assembly 40, which effectively bifurcates the housing, dividing the interior into a lower systems portion 12c and an upper plenum and gas outlet portion 12d.

Referring next to FIGS. 3-8 there is shown the burner and gas valve assembly 40 incorporated into the CO2 generator of the present invention. This assembly includes a panel support 42 with side flanges for connection to the inside of the steel case. Disposed generally central within the panel area is a burner frame 44 in which a plurality of LO-NOx natural gas or liquid propane burners 46 are horizontally mounted and disposed in a generally parallel array. In a preferred embodiment, six burners are employed, two burners 46a supplied with gas from a first gas supply pipe 48 and four burners 46b supplied from a second gas supply pipe 50, sharing an electronic ignition 52 element so as to eliminate the need for an open pilot flame. Further, the burners share a single electron-based sensor, wherein the flame sensor measures electrons present in the blue flame. When the first bank of two burners ignites, the system registers that it has ignited and then checks programming to determine whether 2, 4, or 6 burners should be operating at low, medium, or high outputs). If 2 burners should be operating, nothing further happens (i.e., no further burners are ignited. If 4 burners should be operating, the solenoid valve for the second burner bank 46b opens, and after a 10 second delay, the solenoid valve for burners 46a closes. If 6 burners should be operating, the solenoid valve for burners 46b opens, and the solenoid valve for burners 46a remains open. In operation burners 46a alone provide a low range of $CO_2$ outputs; burners 46b operated alone provide a medium range of $CO_2$ outputs; and burners 46a and 46b operated together provide a high range of $CO_2$ outputs. Fewer burners may be employed in smaller systems. The present preferred embodiment with six burners has outputs ranging from approximately 6 cubic feet per hour to approximately 32 cubic feet per hour, and as those with skill will appreciate, larger or more burners, larger supply volume, and so forth, will result in even greater range for larger facilities. The inventive concept, on the other hand, remains the same.

Gas supplied through the first and second gas supply pipes is metered out through first and second electronic variable-output solenoid gas valves 54, 56, each coupled to a general gas supply (not shown) through a gas coupling 58, the valves having an analog (infinite) range of settings through their operational range from fully closed to fully open. Thus, the exact output of the system can be very finely tailored to produce $CO_2$ at a rate and in a range such that it keeps ambient $CO_2$ within a small window of errors near the system setpoint. A water condensation drain 60 is provided to drain water away from the burner array as expanding LP or natural gas gas creates condensation at and along the supply pipes.

Disposed on the underside of the panel support 42 is an S-plate 62, which provides a heat shield between the burner array and the PCB controller 64. The PCB controller includes a power switch 66, and on/off indicator light 68, power connector 70, and data input ports 72, comprising, for instance, category 5 and RS 232 cable connectors, each connected to the $CO_2$ generator controller of the present invention (described more fully below).

Through the data input ports, the PCB controller may be in a wired or wireless connection with the $CO_2$ generator controller 90 of the present invention (shown in FIGS. 9-10), a wired connection made to connectors 92 and/or 94 on the controller. One of a plurality of power supply connectors 96a-d can be coupled to the generator power supply receptacle 70, each of the controller power supply receptacles having a watertight cover. Alternatively, the generator power supply cord can be plugged directly into a main electrical system for the facility, and generator control is accomplished through wireless (e.g., TIA/EIA-485, formerly RS-485) communications between the generator at 72 and the controller at 92. A first power connector 96a may be used to power a cooling device; a second power connector 96b may be connected to a heating device; a third connector 96c may be connected to the $CO_2$ generator; and a fourth power supply connector 96d may be connected to a humidifier/dehumidifier. The controller may receive data input from a probe or sensor (not shown) that detects any of a number of conditions, alone or in combination, such as light, temperature, gas concentration, humidity, etc., through data port 98. Data port 100 is provided for connection to a computer, a wireless router, or other network connected device. When a photosensor is not included, the system may include a timer or system clock so that system operations can be determined or scheduled according to the time of day. Preferably, the generator controller is a high-impact injection molded enclosure suited for the rugged grow room environment, though metal enclosures are suitable alternatives.

Figure 10:
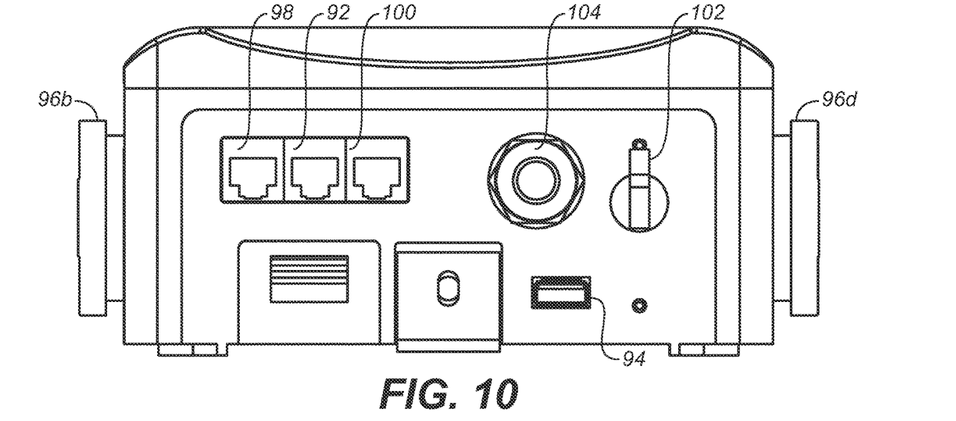
FIG. 10 is a bottom plan view of the controller.

A resettable circuit breaker and/or on/off switch 102 is provided on the bottom of the controller. When functioning as a circuit breaker it facilitates rapid resetting of the system in the event of a voltage or current spike or surge. A main AC power input 104 connects to any 100-250V supply operative at 50-60 Hz. It may also permit the controller to be connected to and coordinated with other controllers in the CEA system, so as to gang or chain controllers, such that when the controller is disabled (for instance, to protect it from operating heavy load devices, such as exhaust fans, in the CEA environment).

Figure 9:
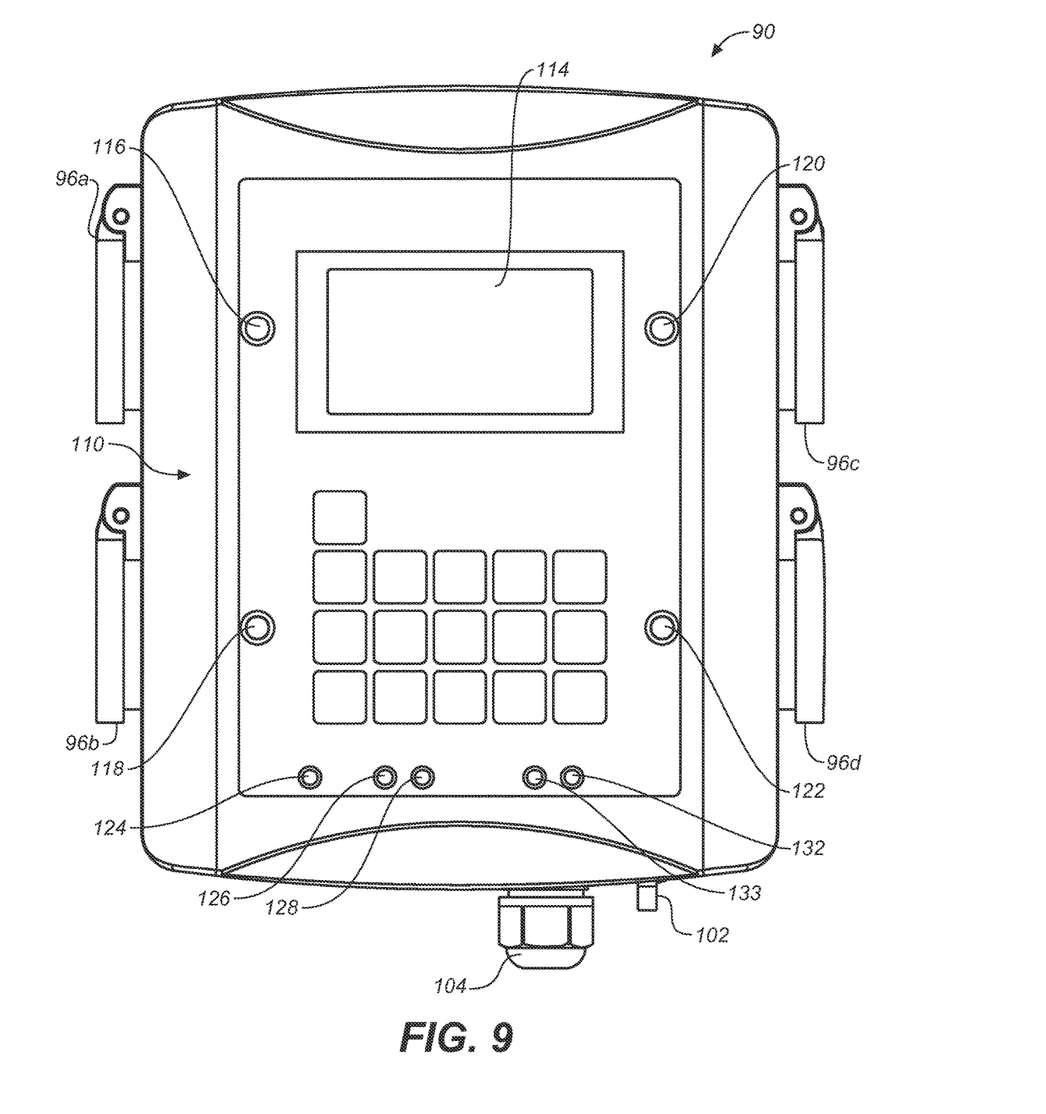
FIG. 9 is a front view in elevation showing the controller employed in the inventive system.

The user interface and control panel 110 on the controller 90 includes a keypad 112, and LCD display 114, a cooling device indicator light 116, a heating device indicator light 118, a $CO_2$ device indicator light 120 (indicating operable connection to the $CO_2$ generator), a humidity device indicator light 122, a daytime indicator light 124, TIA/EIA-485 RXD and TXD indicator lights 126, 128, respectively, operable when the controller is connected to other devices in the local network; a $CO_2$ calibration light 130, and a fuzzy logic indicator light 132.

Figure 9A:
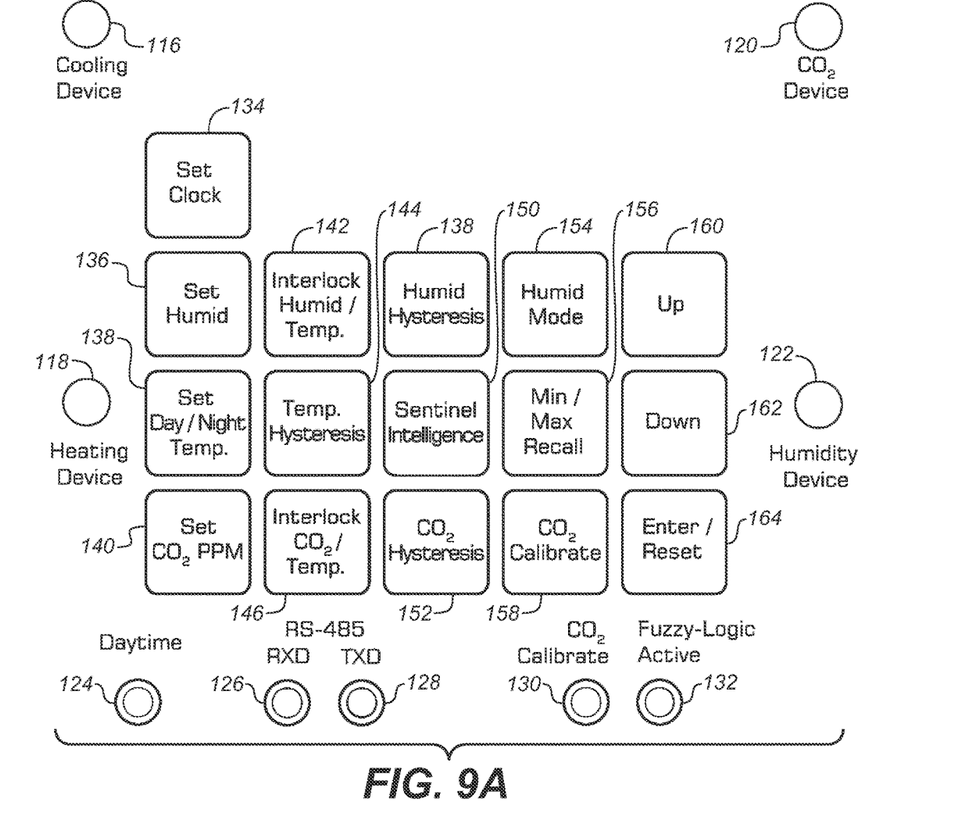
FIG. 9A is schematic front view in elevation of the input buttons presented on the face of the controller.

Keypad keys include a set clock key 134 (for setting the date and time); a set humidity key 136 (for setting the humidity setpoint); a set day/night temperature key 138 (for setting the desired room temperatures during the day and at night); a set $CO_2$ ppm key 140 (for setting the $CO_2$ setpoint); an interlock humidity/temperature key 142 (for linking humidity to temperature and having corrections to the former be a function of measured values of the latter and/or for preventing an exhaust fan from operating at the same time as the $CO_2$ generator); a temperature hysteresis key 144 (for a response lag time for turning on heat/cooling devices so as not to have the devices switching on and off too often); an interlock $CO_2$/temperature key 146 (allows a user to select whether $CO_2$ enrichment or reduction will operate independently of the cooling outlet, or if operation of the cooling outlet will defeat the $CO_2$ enrichment/reduction process); humidity hysteresis key 148 (to set a delay to prevent the humidifier from being switched on and off too frequently); an intelligence key 150 (to set the different setpoints for the various modes); a $CO_2$ hysteresis key 152 (so as to set how low below setpoint levels $CO_2$ must fall before beginning $CO_2$ enrichment again); a humidity mode key 154 (for switching between raising and lowering relative humidity); a minimum/maximum recall key 156 (for recalling the minimum and maximum recorded values for $CO_2$, humidity, and temperature); a $CO_2$ calibrate key 158 (for calibrating and re-calibrating the $CO_2$ sensor connected to the controller); an Up key 160; a Down key 162; and an Enter/Reset key 164, for accepting keypad entries). Note should be made that $CO_2$ hysteresis operates only when using a $CO_2$ generator in an on/off mode or the intelligence mode. When using a fuzzy logic mode, a compressed $CO_2$ gas source is rapidly turned on and off to keep gas levels with a narrow optimal range. Generally, however, it is not suggested to turn hydrocarbon-combustion systems off and on rapidly. Eventually a system may could be devised that use a variable solenoid that would allow for virtually infinite flame settings.

As a possible default setting, intelligence mode will operate the $CO_2$ burners at high (for instance, all burners operating simultaneously with fully open valves) when $CO_2$ concentrations are below 750 ppm. It will operate the burners at medium production when the concentration is between 751-1250 ppm. And it will operate the burners in low mode when the concentration is 1251-1500 ppm. When the concentration is above 1500 ppm, the generator is put into standby mode.

The inventive controller may be operated either with a $CO_2$ generator of the kind described above or with compressed $CO_2$. The controller turns off connected devices through the power supply connectors 96a-d. When operating in binary (on/off) mode, the controller turns $CO_2$ devices on/off through the power supply connector 96c. In the alternative, when in "intelligence mode," analog and variable control inputs are conveyed through an 8 position 8 contact (8p8c) connector located on the bottom of the controller unit using port 92.

The controller is a proportional integral derivative ("PID") using measured $CO_2$ levels, temperature, and humidity as the control loop process variables for PID control, and it is a fuzzy logic controller operating in binary (on/off) fashion when using open loop process variables. It can operate in any of P, PI, PID, and PD modes wherein control actions (powering on and/or off the connected devices) is accomplished by subtracting the various measurements of actual process variables values from the setpoints, calculating the control actions and multiplying each by the calculated error, and summing all three calculation results to derive a controller output. The controller eliminates the need for manual sampling and the guesswork typical of manually corrected environmental conditions. It provides accuracy within a few parts per million for $CO_2$ concentrations.

Figure 11:
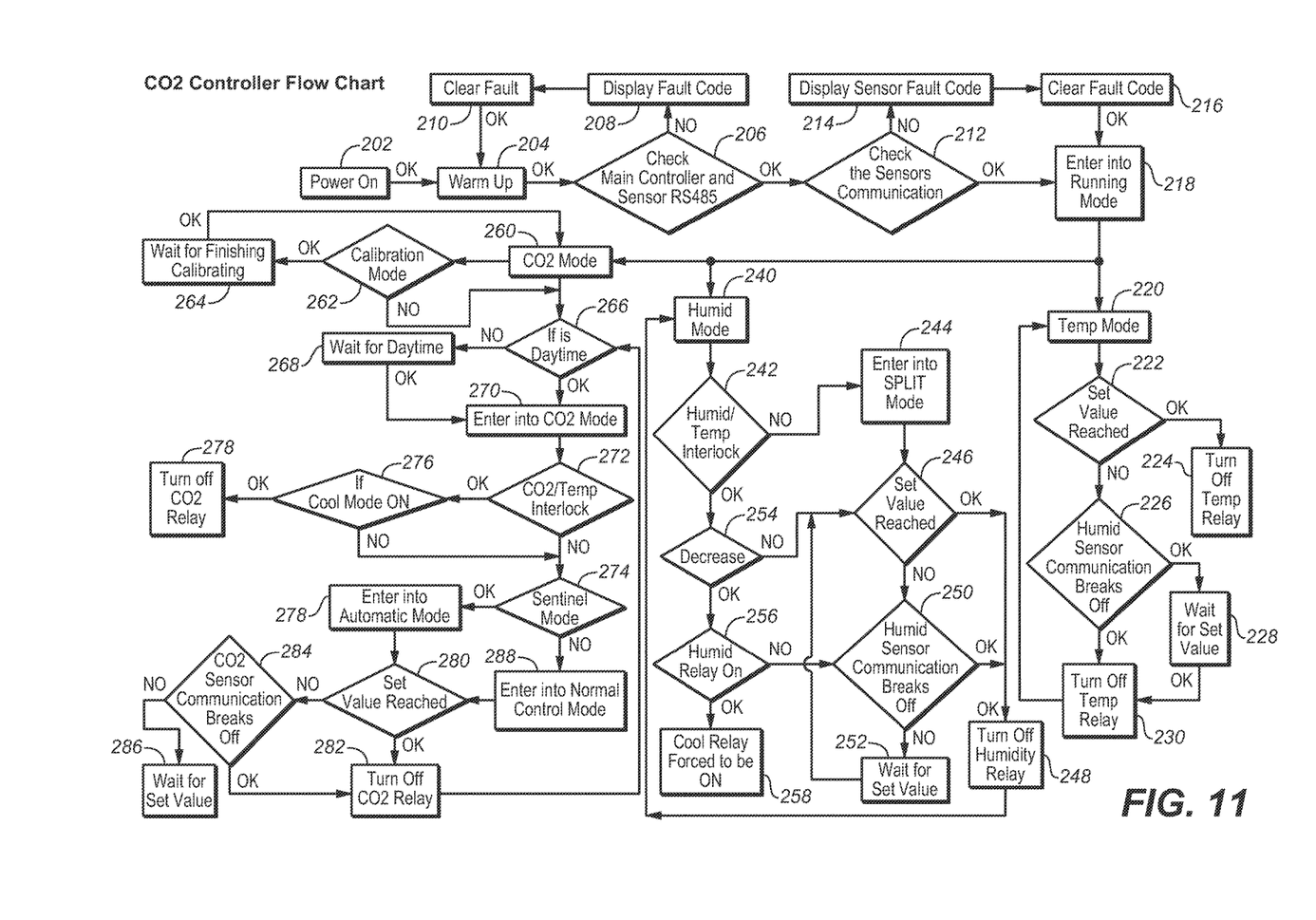
FIG. 11 is a schematic block diagrammatical flowchart showing the method comprising programs made up of computer executable instructions for execution by the controller according to a preferred embodiment of the present invention.

Referring next to FIG. 11, there is shown a flow chart 200 of the control steps implemented upon execution of the control algorithm of the controller of the present invention. This is the software executed by the controller after power on 202 and system warm up 204. At block 206 the system checks the main controller and any sensor connected to the TIA/EIA-485 connector. If it does not detect a connected sensor or detects a sensor fault, it displays a fault code 208 and passes to a prompt for the user to clear the fault or automatically clears the fault 210, depending on the sensor and the detected error. It then loops back to box 206 until no fault is detected and then passes control to box 212, where the sensor communications are tested. If faults are detected, the appropriate fault codes are displayed 214 to prompt manual correction or to clear the fault automatically 216. Once the faults are cleared, the system enters into running mode 218.

Once the system is in running mode, control may pass to one of three operational modes: $CO_2$ mode, humidity mode, and temperature mode, depending on user inputs or on system defaults or programming. When temperature mode is entered 220, block 222 performs a test to determine whether the temperature setpoint has been reached; if it has, the temperature relay is turned off 224; if it has not, the humidity sensor communication is broken 226, and once that is accomplished the heater/cooler is operated until the setpoint is reached 228, at which point the temperature control relay is turned off 230 and control passes back to box 220, to loop back through temperature mode for as long as needed or desired.

If humidity mode is entered 240, the system conducts a test 242 to determine whether the humidity/temperature interlock has been elected by the operator. If it has not been chosen, the system enters into "split" mode 244, and an initial test and calculation is performed at box 246 to ascertain whether the humidity setpoint has been reached; if it has, the humidity relay is turned off 248 and the system loops back to pass control to the entry point 240 for humidity mode; if it has not been reached, humidity sensor communication to the controller is broken off 250 to allow humidity to rise to the setpoint 252, and control loops back through box 246 until the setpoint is reached.

If at box 242 the humidity/temperature interlock has been selected, the system checks 254 to determine whether a humidity decrease is required, in which event the humidifier relay is turned on 256, and if a decrease is not called for, the system checks to see whether the setpoint has been reached by passing through box 246 again. If the humidifier relay is turned on, the cooler relay is also forced on 258.

When the system enters $CO_2$ mode 260, the system looks to see whether calibration mode has been manually entered 262, in which event it waits for calibration to be completed 264. If calibration mode has not been selected, the system checks photosensor or time clock readings to determine whether it is daytime or a preprogrammed on/off time 266; if it is not, it awaits daytime 268; if it is, it enters into $CO_2$ mode 270.

The system then checks at box 272 to determine whether the $CO_2$/temperature interlock option has been manually selected by the user; if it has not, a succeeding check is made at box 274 to see whether intelligence mode is in operation and communicating through port 96c or regular mode communicating through port 92; if the interlock option has been selected, it then checks 276 to see whether cooling mode is on, and if it is, the $CO_2$ relay is turned off; if cooling mode is not on, control passes to box 274. If Sentinel mode is selected, the system enters into automatic mode 278, and control passes to test 280 to determine whether the setpoint has been reached, and if it has, the CO2 relay is turned off 282; and if it has not, the $CO_2$ sensor communication is broken off 284 and the system waits 286 until $CO_2$ levels reach setpoint concentrations 286. If, at box 274, Sentinel mode has not been selected, the system enters into normal control mode 288, and control passes to box 280, where processing continues as described.

In an embodiment, the inventive system also includes a fail-safe feature that prevents the gas generator from persisting in gas generation mode. This is accomplished by detecting the connection between the controller and generator. If the TIA/EIA-485 connection is lost for a predetermined amount of time, the generator will go into a pause mode until communications are re-established. Thus, there is a constant duplex communication via TIA/EIA-485 between the controller and the generator rather than only a periodic sending of data and/or command signals.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Furthermore, it will be appreciated that while the present system is particularly adapted for use in CEA, the controller can be incorporated in nearly any system using one or more environmental control devices. Explanation of the system using CEA as an exemplary field in which to implement the system is for purposes of illustration only, because control of a number of environmental variables—temperature, humidity, $CO_2$ gas concentrations, light, and so forth—is common in CEA. Those with skill in the art, however, will appreciate that concentrations of any atmospheric gas may be controlled using the inventive control and generation system. Further, gas enrichment is emphasized, as it is commonly practiced in CEA; but gas concentration reduction can also be accomplished using the controller of the present invention in connection with a gas scrubber system. Accordingly, reference to a particular kind of gas enrichment/reduction herein is not limiting.

Therefore, the above description and illustrations should not be construed as limiting the scope of the invention, which is defined by the appended claims.

What is claimed as invention is:

1. A $CO_2$ generation and control system for controlling ambient gas $CO_2$ concentrations in a controlled environment agriculture facility, comprising:
   a housing;
   a controller disposed within said housing; and
   a $CO_2$ gas supply electronically coupled to said controller so as to receive control signals from said controller;
   wherein said controller includes a plurality of data ports for connection to one or more environmental condition sensors, and further includes a processor and upon executing, receives and responds to signals from said one or more data ports and adjusts gas output from said gas supply in response thereto, the adjustments being adjustable between and including a no gas output setting to and including a high gas output setting;
   wherein said controller includes a fuzzy logic mode for operating in binary (on/off) fashion in any of proportional proportional/integral proportional integral derivative, and proportional derivative modes; and
   wherein control actions involving powering on and/or off connected environmental control devices is accomplished by utilizing the various measurements of actual process variables values from setpoints, generating the control actions and using each errors, and generating all three results to derive an optimized controller output.

2. The $CO_2$ generation and control system of claim 1, wherein said controller is a proportional integral derivative controller.

3. The $CO_2$ generation and control system of claim 1, wherein said controller uses measured $CO_2$ levels, temperature, and humidity as control loop process variables for programmable integral derivative control.

4. The $CO_2$ generation and control system of claim 1, wherein said controller is coupled to a plurality of power supplies for operating environmental control devices.

5. The $CO_2$ generation and control system of claim 1, wherein said environmental control devices are selected from the group consisting of a cooling device, a heating device, a $CO_2$ generator, and a humidifier/dehumidifier.

6. The $CO_2$ generation and control system of claim 1, wherein said controller is configured to receive data input from a plurality of sensors selected from the group consisting of light sensors, temperature sensors, gas concentration sensors, and humidity sensors.

7. The $CO_2$ generation and control system of claim 1, further including a system clock or timer whereby system operations are determined or scheduled according to the time of day.

8. The $CO_2$ generation and control system of claim 1, wherein said controller includes a user interface and control panel having input means and a display.

9. The $CO_2$ generation and control system of claim 8, wherein said user interface includes input apparatus for inputting setpoints for various environment conditions.

10. The $CO_2$ generation and control system of claim 9, wherein said input apparatus includes inputs selected from the group consisting of set date and time, set humidity setpoint, set day/night temperature for setting the desired room temperatures during the day and at night, set $CO_2$ ppm for setting the $CO_2$ setpoint, and interlock humidity/temperature for linking humidity to temperature and having corrections to the former be a function of measured values of the latter and/or for preventing an exhaust fan from operating at the same time as the $CO_2$ generator, temperature hysteresis for setting a response lag time for turning on heat/cooling devices so as not to have the devices switching on and off too often, interlock $CO_2$/temperature for selecting whether $CO_2$ enrichment or reduction will operate independently of the cooling outlet, or if operation of the cooling outlet will defeat the $CO_2$ enrichment/reduction process; humidity hysteresis to set a delay to prevent a humidifier from being switched on and off too frequently; intelligence to set different setpoints for various modes; $CO_2$ hysteresis to set how low below setpoint levels $CO_2$ must fall before recommencing $CO_2$ enrichment; humidity mode for switching between raising and lowering relative humidity; minimum/maximum recall for recalling the minimum and maximum recorded values for $CO_2$, humidity, and temperature, $CO_2$ calibrate for calibrating and re-calibrating the $CO_2$ sensor connected to the controller, up/down for scrolling through options and increasing or decreasing values, and an Enter input, or any combination thereof.

11. The $CO_2$ generation and control system of claim 1, wherein using a fuzzy logic mode, a compressed $CO_2$ gas source is rapidly turned on and off to keep gas levels with a narrow optimal range.

12. The $CO_2$ generation and control system of claim 1, wherein said gas supply is either a compressed $CO_2$ gas supply or a LO-NOx $CO_2$ generator using natural gas or liquid propane burners.

13. The $CO_2$ generation and control system of claim 1, wherein said gas supply is a LO-NOx $CO_2$ generator.

14. The $CO_2$ generation and control system of claim 1, wherein said controller operates in a binary mode and upon in the binary mode turns on and off connected devices through power supply connectors.

15. The $CO_2$ generation and control system of claim 1, wherein said controller has an intelligence mode, and operates in the intelligence mode sends analog and variable control input signals to environmental control devices.

16. A $CO_2$ generation and control system for controlling ambient gas $CO_2$ concentrations in a controlled environment agriculture facility, comprising:

a housing;
a controller disposed within said housing;
a $CO_2$ gas supply electronically coupled to said controller so as to receive control signals from said controller;
wherein said controller includes a plurality of data ports for connection to one or more environmental condition sensors, and further includes a processor and upon executing, receives and responds to signals from said one or more data ports and adjusts gas output from said gas supply in response thereto, the adjustments being adjustable between and including a no gas output setting to and including a high gas output setting;
wherein said controller has an intelligence mode, and operates in the intelligence mode sends analog and variable control input signals to environmental control devices; and
wherein upon operating in intelligence mode, said controller operates said gas supply at high upon a measured gas concentration is below a preselected concentration, operates said gas supply at medium production upon the same gas concentration is measured to be a second preselected range, operates said gas supply upon the gas concentration is in a third predetermined range, and puts the gas supply in standby mode upon the measured gas concentration exceeds a certain predetermined value.

17. The $CO_2$ generation and control system of claim 16, wherein said controller is coupled to a plurality of power supplies for operating environmental control devices.

18. The $CO_2$ generation and control system of claim 17, wherein said environmental control devices are selected from the group consisting of a cooling device, a heating device, a $CO_2$ generator, and a humidifier/dehumidifier.

19. The $CO_2$ generation and control system of claim 16, wherein said controller is configured to receive data input from a plurality of sensors selected from the group consisting of light sensors, temperature sensors, gas concentration sensors, and humidity sensors.

\* \* \* \* \*